March 4, 1958 G. A. CARLSON 2,825,300
BARN STRUCTURE
Filed Feb. 27, 1956

INVENTOR.
GEORGE A. CARLSON
BY
Wheeler, Wheeler & Wheeler
ATTORNEYS

United States Patent Office 2,825,300
Patented Mar. 4, 1958

2,825,300

BARN STRUCTURE

George A. Carlson, Deerbrook, Wis.

Application February 27, 1956, Serial No. 567,880

8 Claims. (Cl. 119—16)

This invention relates to a barn structure particularly adapted for the open housing of livestock such as milk cows.

In the barn structure of the present invention a single barn gutter serves the livestock feeding platform and the livestock bedding area, the bedding area being at a level materially lower than the feeding platform to accommodate for the accumulation of manure and successive layers of bedding straw over a relatively long period of time. The barn gutter communicates with the feeding platform by means of a relatively deep trough having a grating which is substantially at the level of the floor of the feeding platform. The barn gutter communicates with the bedding area by means of flow channels provided in the floor of the bedding area and which discharge laterally into the gutter.

The feeding area and bedding area are connected by a ramp over which the cattle move from one area to the other. As the surface level of the bedding area rises by accumulation of manure and straw the lower portion of the ramp may be covered as the difference in level of the two areas is reduced.

The open housing barn structure of the present invention has the sanitary facilities and conveniences of a stanchion type barn. The farmer need enter the bedding area of the barn to remove manure and bedding material only at infrequent periodic intervals at which time the accumulation of bedding material and manure may be removed by powered apparatus. Meanwhile liquid flow from the bedding area is conveyed directly to the barn gutter to be automatically removed from the barn. When the animals feed from the manger in the feeding area, manure is discharged through the grating into the barn gutter.

Figure 1:
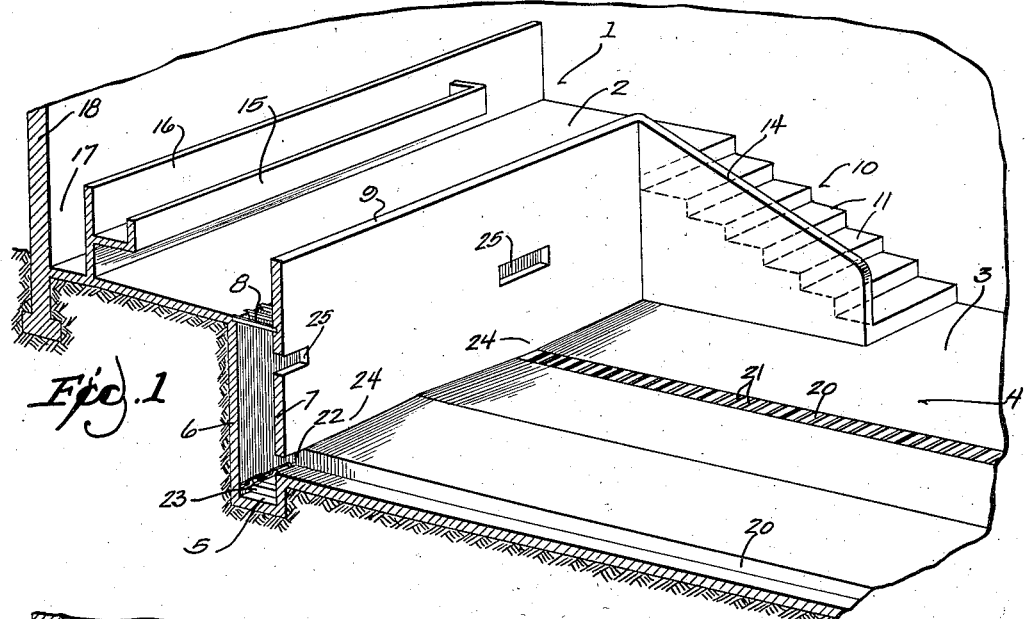
Fig. 1 is a fragmentary perspective view, partly in cross section, diagrammatically illustrating my novel barn structure.
Figure 2:
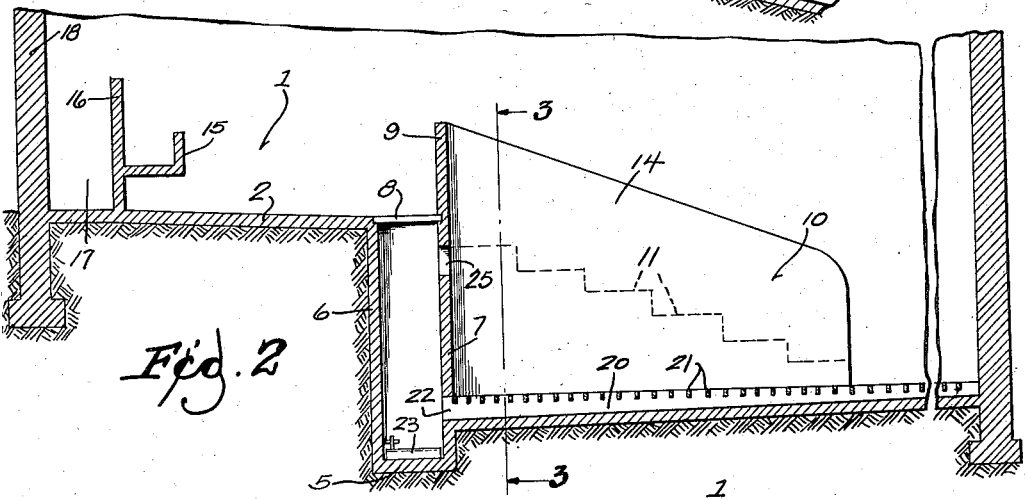
Fig. 2 is a vertical cross section taken through the structure shown in Fig. 1.
Figure 3:
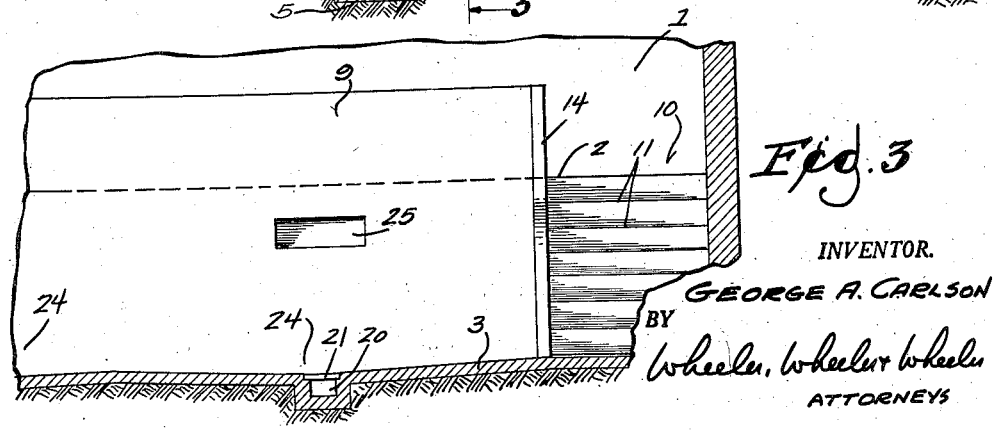
Fig. 3 is a cross section taken along the line 3—3 of Fig. 2.

In the barn structure of the present invention the livestock feeding area 1 has a floor 2 which is materially elevated above the level of the floor 3 of the bedding area 4. At one side of the floor 3 I provide a barn gutter 5 which is disposed between walls 6 and 7 which comprise a deep trough with its top covered by the grating 8 stubstantially at the level of floor 2. Wall 7 may be upwardly extended at 9 to constitute a guard rail between the feeding area 1 and bedding area 4 and prevent the animals from falling from floor 2 into the bedding area 4. The wall 9 is desirably solid and high enough to prevent the animals from seeing thereover.

Floors 2 and 3 may be connected by one or more passageways or inclined ramps 10 which may optionally be provided with steps 11. I may also optionally provide a guard rail 14 at the side of the ramp 10.

At one side of the feeding area 1 opposite the grating 8 I provide on wall 16 a manger 15 into which livestock feed may be placed by the farmer. The spacing between the manger 15 and grating 8 is adequate to permit a line of animals to feed therefrom and still permit other animals to pass to their rear. As the livestock feed from the manger 15 manure may be deposited directly through the grating 8 into the barn gutter 5, or deposited on the floor 2 which desirably slopes slightly toward the grating. Accordingly, as the animals back away from the manger they will kick the manure through the grating.

To facilitate access by the farmer to the manger 15 I may provide a walkway 17 between wall 16 and outer wall 18 of the barn. The wall 16 is desirably low enough to permit handling of feed thereover.

The floor 3 of bedding area 4 is provided with drainage channels 20 which have a slight incline toward the barn gutter 5 into which they discharge waste flow from the bedding area. The channels 20 are desirably covered by gratings 21. The channel outlets 22 are desirably spaced above the bottom of the barn gutter 5 to preclude backing up of waste into the bedding area during periods when the conventional barn gutter cleaner 23 is not in operation.

The floor 3 is desirably inclined both laterally and longitudinally of the barn to form troughs 24 inclined toward the gutter 5 and at the bases of which the channels 20 are disposed. Accordingly, waste will flow by gravity into the gutter 5.

In open housing of livestock the animals are free to move about the bedding area 4 at will and may bed down wherever they choose. The farmer spreads an initial layer of bedding straw over floor 3. As manure accumulates in the bedding area the farmer spreads successive fresh layers of straw thereover, allowing the level of straw and manure accumulation to rise over the course of several months without need for removing it except at infrequent periodic intervals. It has been the experience of farmers using the open housing system that the animals remain cleaner than in stanchioned barns.

The farmer may optionally wish to remove local deposits of manure at frequent intervals. Accordingly, ports 25 are provided in gutter wall 7 just below the level of grating 8. Accordingly, the farmer may pitch such local deposits through the ports 25 into the gutter 5, thus reducing the need for fresh bedding straw.

Over a course of many months the accumulation of manure and bedding straw in the bedding area 4 will rise and will approach the level of floor 2 of the feeding area 1. During this period liquid flow from the bedding area will drain through the channels 20 into the barn gutter 5. Accordingly, the combined layers of straw and manure which accumulate on the floor 3 are relatively dry and hard and will pack quite solidly under the weight of the animals.

The animals will spend most of their time in the bedding area 4, although they are free to move at will up the ramp 10 into the feeding area 1. The animals have no difficulty in walking on grating 8. As the manure level in bedding area 4 rises the climb up ramp 10 is reduced, the manure simply covering the lower steps 11.

The barn gutter cleaner 23 is conventional. Flow from both the bedding area and the feeding area is directed into the same barn gutter and is removed by the barn gutter cleaner from the barn.

After sufficient manure has accumulated in the bedding area 4 the farmer may drive a tractor or other power operated machine with a manure bucket attachment into the bedding area and clean out the accumulation of manure and straw. This cleaning operation, however, need not be more than once or twice a year and in the interim period the animals remain as clean or cleaner than in conventional stanchioned barns.

I claim:

1. A barn structure comprising an animal bedding surface, an animal feeding surface at a level higher than the bedding surface, animal passageway means between said surfaces, a barn gutter intermediate said surfaces, flow communicating means from the bedding surface to said gutter, and a relatively deep trough above said gutter and having an opening substantially at the level of the feeding surface to communicate flow to said gutter from said feeding surface.

2. The device of claim 1 in further combination with a guard rail extending above the level of said feeding surface to isolate the feeding surface from the bedding surface.

3. A barn structure comprising an animal bedding surface, an animal feeding surface at a level higher than the bedding surface, a barn gutter intermediate said surfaces, flow communicating means from the bedding surface to said gutter, and a relatively deep trough above said gutter and having an opening substantially at the level of the feeding surface to communicate flow to said gutter from said feeding surface, in further combination with an inclined ramp between said surfaces.

4. The device of claim 1 in which said feeding surface is provided with a feeding manger in spaced parallel relation to said gutter.

5. A barn structure comprising a feeding area having a manger, a floor and a grating at substantially the level of said floor and in spaced parallel relation to said manger, a barn gutter beneath said grating and a relatively deep trough between said grating and said barn gutter, a bedding area having a floor at a level lower than the floor of the feeding area but above the level of said gutter, animal passageway means between said areas and means for communicating flow from the bedding area floor to said gutter.

6. A barn structure comprising a feeding area having a manger, a floor and a grating at substantially the level of said floor and in spaced parallel relation to said manger, a barn gutter beneath said grating and a relatively deep trough between said grating and said barn gutter, a bedding area having a floor at a level lower than the floor of the feeding area but above the level of said gutter, and means for communicating flow from the bedding area floor to said gutter, further provided with a guard rail extending above the level of said grating and at the opposite side of said grating from said manger to separate the feeding area from the bedding area, and an inclined ramp connecting the respective floors of said feeding and bedding areas for passage therebetween of animals housed in said structure.

7. The device of claim 5 in further combination with a walkway at the opposite side of said manger from said grating for access thereto by the farmer.

8. The device of claim 5 in which said trough has a wall facing said bedding area, said wall having a port above the level of the bedding area floor for transfer of manure between the bedding area and the gutter.

References Cited in the file of this patent

UNITED STATES PATENTS

| | | |
|---|---|---|
| 2,472,122 | Polivka | June 7, 1949 |
| 2,736,291 | Duff | Feb. 28, 1956 |
| 2,737,925 | Pearson | Mar. 13, 1956 |
| 2,740,377 | Duncan | Apr. 3, 1956 |